United States Patent [19]

Kubota et al.

[11] 3,723,639

[45] Mar. 27, 1973

[54] COLOR TELEVISION CAMERA

[75] Inventors: Yasuharu Kubota; Ryuji Shiono, both of Kanagawa, Japan

[73] Assignee: Sony Corporation, Tokyo, Japan

[22] Filed: Aug. 31, 1971

[21] Appl. No.: 176,554

[30] Foreign Application Priority Data

Mar. 31, 1970 Japan ....................45/27614
Mar. 31, 1970 Japan ....................45/27615
Mar. 31, 1970 Japan ....................45/27616
Sept. 1, 1970 Japan ....................45/76518

[52] U.S. Cl. ....................178/5.4 ST, 178/5.4 F
[51] Int. Cl. ....................H04n 9/06
[58] Field of Search ......178/5.4, 5.4 ST, 5.4 F, 5.4 H

[56] References Cited

UNITED STATES PATENTS 2,843,659 7/1958 James ....................178/5.4 ST

*Primary Examiner*—Richard Murray
*Attorney*—Lewis H. Eslinger et al.

[57] ABSTRACT

A color television camera utilizing a vidicon tube that has a filter in the form of alternate stripes for the primary colors red, green, and blue, electrodes for each set of three stripes and a photoconductive layer. An alternating voltage is applied to the electrodes to provide a predetermined pattern on the surface of the photoconductive layer in the form of an index signal which overlaps on the photoconductive layer with the image to be reproduced. The composite signal on the photoconductive layer of an index signal and a color video signal including luminance and chrominance components is derived from the same terminals that applied the reference alternating voltage to the electrodes, and the signals thus derived are connected to a circuit which separates the color video signal from the index signal. The index signal is then applied to three demodulators to obtain the color video signals. Means are provided to reverse the phase of the chrominance components on alternate lines or in another suitable order to avoid bright and dark vertical stripes in the reproduced image.

7 Claims, 24 Drawing Figures

INVENTOR.
YASUHARU KUBOTA
BY RYUJI SHIONO
Lewis H. Eslinger
ATTORNEY

INVENTOR.
YASUHARU KUBOTA
BY RYUJI SHIONO
[signature]
ATTORNEY

INVENTOR.
YASUHARU KUBOTA
BY RYUJI SIONO
Lewis H. Eslinger
ATTORNEY

INVENTOR.
YASUHARU KUBOTA
BY RYUJI SHIONO
Lewis H. Eslinger
ATTorney

INVENTOR.
YASUHARU KUBOTA
BY RYUJI SHIONO
Lewis H. Eslinger
ATTORNEY

INVENTOR.
YASUHARU KUBOTA
BY RYUJI SHIONO
ATTORNEY

INVENTOR.
YASUHARU KUBOTA
RYUJI SHIONO
BY
Lewis H. Eslinger
ATTORNEY

COLOR TELEVISION CAMERA

BACKGROUND OF THE INVENTION

1. Field of the Invention

This invention relates to a color television camera, and particularly to an improved demodulating system for a color television camera that has index signals produced along with the video signals.

2. The Prior Art

Co-pending U.S. Pat. application Ser. No. 72,593, entitled COLOR TELEVISION CAMERA, filed Sept. 16, 1970 in the name of Yashuharu Kubota, one of the inventors of the present case, discloses a pickup tube of the type having a plurality of electrodes, a color filter and a photoconductive surface and adapted to form color separated images on the photoconductive layer. In addition, an alternating voltage is supplied to the plurality of electrodes. Accordingly, a predetermined pattern of potential changes is formed on the surface of the photoconductive layer of the pickup tube which is reproduced as an index signal. In this manner the index signal does not narrow the dynamic range of the image pickup tube and the resolution of the color video signal is not lowered.

The index signal, luminance signal and chrominance signal are not derived from each electrode but are picked up in the form of one composite signal, so that even if crosstalk exists between the electrodes, color difference signals can be readily derived from a demodulator circuit, and accordingly a color video signal of good white balance can be obtained.

Since the index signal is obtained at the output of the pickup tube by supplying an alternating voltage to the electrodes in synchronism with the line scanning period of the pickup tube, demodulation of the color video signal is easily accomplished. Further, when the color video signal is reproduced without the chrominance signal the index signal is simply obtained by adding to the output of the image pickup tube a signal produced by delaying the pickup tube output by one horizontal scanning period.

The index signal and the chrominance signal are in the same band, and hence the bands of the luminance signal and the chrominance signal can be widened to thereby provide a color video signal with high resolution. In addition, since the index signal and the chrominance signal are derived from a common preamplifier and filter, no difference in the delay time between these signals is produced and, accordingly, a picture of excellent white balance can be obtained.

The formation of the color separated images on the photoconductive layer of the pickup tube may be accomplished by any conventional method. For example, a lens screen consisting of many lenticular lenses can be disposed on the surface of the face plate of the pickup tube and the image of a color filter consisting of a plurality of pairs of striped color filter elements and interposed between an object to be televised and the lens screen is projected by the lens screen on to the photoconductive layer and, at the same time, the image of the object being televised is caused by an objective lens to overlap on the image of the color filter. Further, it is also possible that the image of the object to be televised is focused by an objective lens on to the photoconductive layer through a color filter disposed inside of the pickup tube in close proximity to the photoconductive layer. The optical system is simple in construction and need not be adjusted, so that an inexpensive color television camera can be produced.

The camera pickup tube disclosed in the co-pending application has many advantages in comparison with well-known color television cameras using a single image pickup tube. However, the circuit disclosed in that application has a tendency to produce a color video output signal that contains a small amount of a carrier component of a chrominance signal $S_{CL}$. The causes of producing this carrier component are: leakage through the synchronous detectors; and leakage to the luminance signal Y from the output of the synchronous detectors. The color video signal containing the leakage carrier component causes a pattern of vertical bright and dark stripes in the reproduced color picture, and the spacing of the stripes in the pattern corresponds to the carrier signal frequency.

One of the principal objects of the present invention is, in a television camera with index signals, to provide means for deriving the video signal in such a way as to avoid creating undesired interference patterns in a television image produced by such video signal.

Other objects will be apparent from the following specification and drawings.

BRIEF DESCRIPTION OF THE INVENTION

In accordance with the present invention, the connections to the synchronous detectors are reversed so that the index signal is applied through the phase shifters to the synchronous detectors and the chrominance signal is applied through an inverter and switching circuit to the same detectors. The switching circuit operates at the end of each horizontal scanning line to reverse the phase of the chrominance signal as applied to the synchronous detectors so that any index signal included therein would be shifted in phase each scanning line. The tendency of the index signal to produce alternate dark and light dots which would add up to be dark and light vertical bars is thus broken down so that all that remains is the dark and light dots. However, these are in a pattern that is not objectionable in the reproduced television image.

Alternatively in accordance with this invention, the index signals are produced optically or with only one set of index electrodes.

DESCRIPTION OF THE PREFERRED EMBODIMENTS

Figure 1:
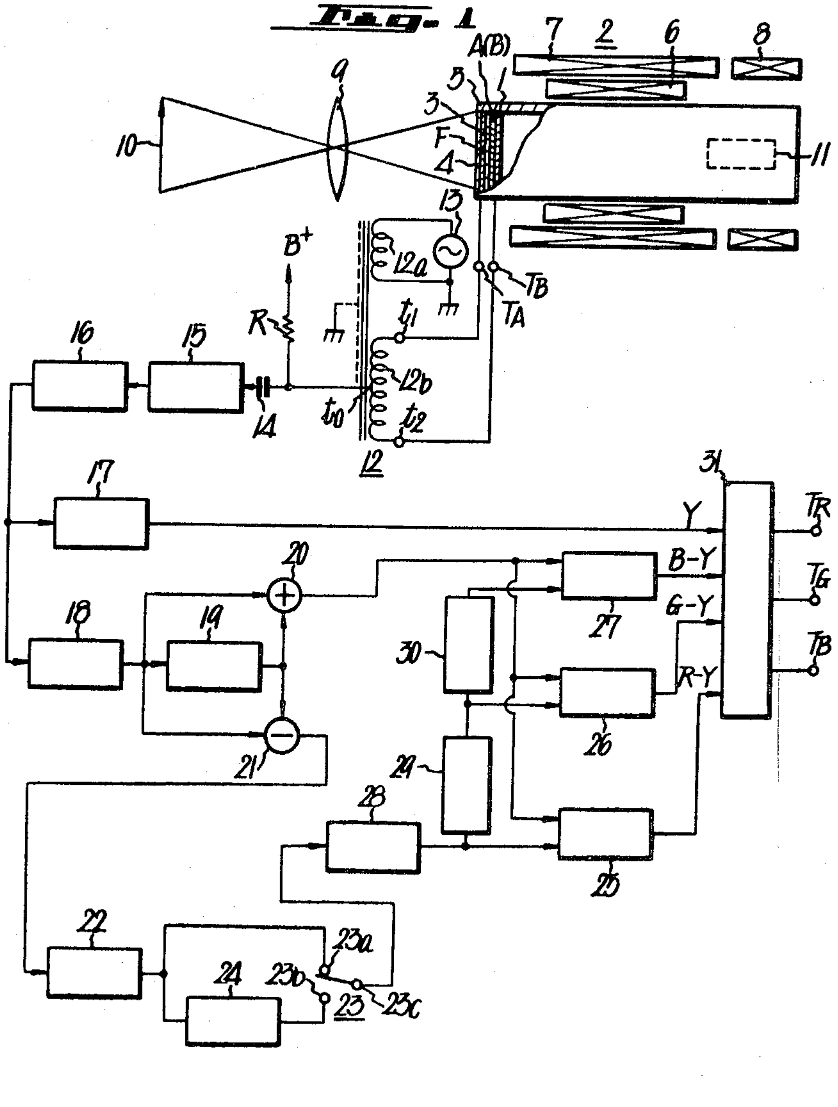
FIG. 1 is a system diagram illustrating one example of a color television camera in accordance with the prior art.
Figure 2:
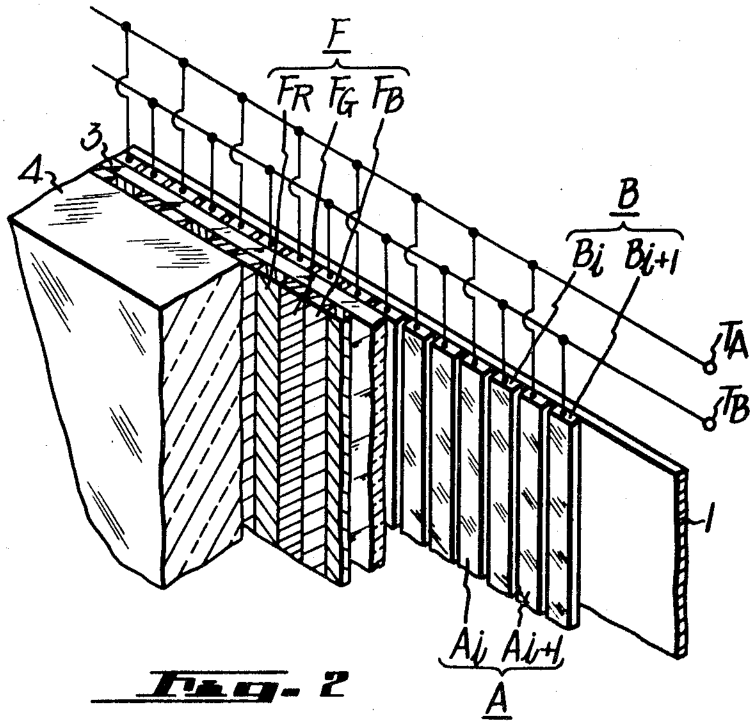
FIG. 2 is a perspective view partly in cross-section and showing the principal parts of the pickup tube employed in the color television camera illustrated in FIG. 1.

FIGS. 1–5 illustrate a camera in accordance with the aforesaid application Ser. No. 72,593. In FIGS. 1 and 2 two sets of electrodes A ($A_1, A_2, \ldots A_i, \ldots A_n$) and B ($B_1, B_2, \ldots B_i, \ldots B_n$) are disposed adjacent the photoconductive layer 1 of a pickup tube 2. The photoconductive layer 1 is formed, for example, of materials such as antimony trisulfide, lead oxide, etc. The electrodes A and B are transparent conductive layers formed of tin oxide including antimony and they are alternately arranged in an order which may, for example, be $A_1,B_1,A_2,B_2, \ldots A_iB_i, \ldots A_n,B_n$, the electrodes being respectively connected to terminals $T_A$ and $T_B$ for connection with external circuits. In this case, the electrodes are disposed so that their longitudinal directions may cross the horizontal scanning direction of an electron beam.

The electrodes A and B are disposed on one side of a glass plate 3, on the other side of which an optical filter F made up of red, green, and blue color filter elements $F_R$, $F_G$, and $F_B$ arranged in a repeating cyclic order of $F_R$, $F_G$, $F_B$, $F_R$, $F_G$, $F_B$, . . . are disposed parallel to the length of the electrodes A and B in such a manner that each triad of red, green, and blue color filter elements $F_R$, $F_G$, and $F_B$ may be opposite to each pair of adjacent electrodes $A_i$ and $B_i$. So long as the electrodes A and B and the optical filter F are aligned with each other in their longitudinal directions, their relative arrangement is optional. The optical filter F is affixed to the faceplate 4.

The pickup tube 2 has enclosed therein the photoconductive layer 1, the electrodes A and B, the glass plate 3, the optical filter F and the faceplate 4 mounted on one end of the tube envelope 5. About the image pickup tube 2 there are mounted a deflection coil 6, a focusing coil 7, and an alignment coil 8. Reference numeral 9 indicates an image lens, by means of which the image of an object 10 to be televised is focused on to the photoconductive layer 1 through the faceplate 4. Reference numeral 11 designates an electron gun for emitting an electron beam.

The operating circuit for the tube 2 includes a transformer 12 that consists of a primary winding 12*a* and a secondary winding 12*b* having a mid tap, or midpoint, $t_0$. The terminals $t_1$ and $t_2$ of the secondary winding 12*b* are respectively connected to the terminals $T_A$ and $T_B$ of the image pickup tube 2. The primary winding 12*a* is connected to a signal source 13 which produces an alternating signal $S_1$, shown in FIG. 3, that is synchronized with the line scanning period of the image pickup tube 2. This alternating signal $S_1$ has a rectangular waveform with a pulse width equal to a horizontal scanning period H of the electron beam, namely a pulse width of, for example, 63.5 microseconds and a frequency of 7.875 KHz, which is ½ of the horizontal scanning frequency. The midpoint $t_o$ of the secondary winding 12*b* of the transformer 12 is connected to the input of a preamplifier 15 through a capacitor 14 and is supplied with a DC bias voltage of 10 to 50V from a power source B+ through a resistor R.

Figure 5:
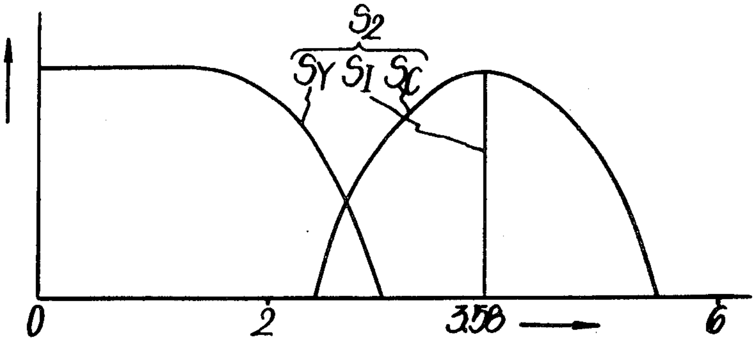
FIG. 5 is a graph showing one example of a frequency spectrum for a color video signal produced by the color television camera of FIG. 1.
Figure 4A:
Figure 4B:
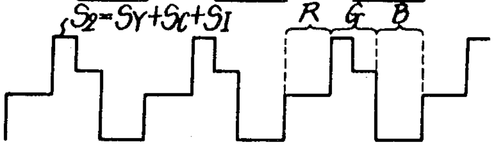

With such an arrangement, the electrodes A and B are alternately supplied with voltages higher and lower than the DC bias voltage for every horizontal scanning period, so that a striped potential pattern corresponding to the electrodes A and B is formed on the surface of the photoconductive layer 1. Accordingly, when the image pickup tube 2 is not exposed to light, a signal $S_I$ corresponding to the rectangular waveform illustrated in FIG. 4A is derived at the midpoint $t_o$ of the secondary winding 12*b* in a scanning period $H_i$ due to electron beam scanning. When a DC bias voltage of, for example, 30V is supplied to the midpoint $t_0$ of the secondary winding 12*b* and an alternating voltage of 0.5V is impressed between the terminals $T_A$ and $T_B$, a current flowing across the resistor R varies by 0.05 microamperes, which can be used as an index signal. The frequency of this index signal $S_I$ is optically determined with reference to the width and interval of the electrodes A and B and one horizontal scanning period of the electron beam, and can, for example, be 3.58MHz. When the image of the object 10 is focused on the photoconductive layer 1, signals corresponding to the light intensity of the filtered red, green, and blue components are produced on the photoconductive layer 1 in overlapping relation with the index signal $S_I$ to produce a composite signal $S_2$ such as illustrated in FIG. 4B, in which the reference characters R, G, and B, respectively, designate portions of the composite signal $S_2$ corresponding to the red, green, and blue color components. The composite signal $S_2$ is the sum of the luminance signal $S_Y$, the chrominance signal $S_C$ and the index signal $S_I$, namely $S_2=S_Y+S_C+S_I$. The frequency spectrum of the composite signal $S_2$, as illustrated in FIG. 5, is determined by the width of the electrodes A and B, the width of the optical filter F and the horizontal scanning period. That is, the composite signal $S_2$ in its entirety is in a bandwidth of 6MHz and the luminance and chrominance signals $S_Y$ and $S_C$ are respectively arranged in the lower and higher bands. It is preferred to minimize overlapping of the luminance and chrominance signals $S_Y$ and $S_C$ and, if desired, it is possible to dispose a lenticular lens or the like in front of the image pickup tube 2. This optically lowers resolution and narrows the luminance signal band.

In the next horizontal scanning period $H_{i+1}$, the voltage (the alternating signal) applied to the electrodes A and B is reversed in phase, in which case an index signal $-S_I$ is produced such as depicted in FIG. 4A', which is opposite in phase to the index signal $S_I$ shown in FIG. 4A. Accordingly, a composite signal $S_2'$ is derived at the input side of the preamplifier 15 as shown in FIG. 4B', namely $S_2'=S_Y+S_C-S_I$.

Figure 4C:
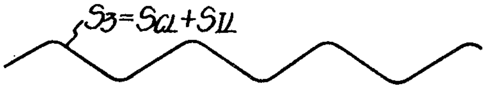
Figure 4A:
Figure 4B:
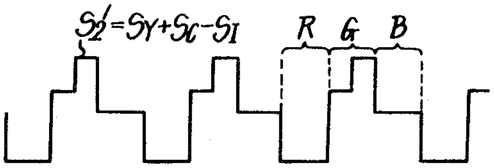
Figure 4C:

Such a composite signal $S_2$ (or $S_2'$) is first supplied to the preamplifier 15 to be amplified and is then supplied to the process amplifier 16 for waveform shaping and/or gamma correction. Thereafter the signal is applied to a low-pass filter 17 and a bandpass filter 18, respectively. As a result, the luminance signal $S_Y$ and a signal $S_3=S_{CL}+S_{IL}$ such as shown in FIG. 4C (or a signal $S_3'={}_{CL}-S_{IL}$ such as depicted in FIG. 4C') are respectively derived from the low-pass filter 17 and the bandpass filter 18 separately from each other. $S_{CL}$ and $S_{IL}$ are low frequency components or fundamental components of the chrominance signal $S_L$ and the index signal $S_I$, respectively.

The separation of the index signal $S_I$ and the chrominance signal $S_C$ will hereinbelow be described. Since the repetitive frequencies of the index signals $S_I$ and the chrominance signal $S_C$ are equal to each other, the separation of these signals is achieved in the following manner without using a filter.

Figure 4D:

Reference numeral 19 indicates a delay circuit such, for example, as an ultrasonic delay line, by means of which the signal $S_3=S_{CL}+S_{IL}$ (or $S_3'=S_{CL}-S_{IL}$) derived from the bandpass filter 18 is delayed by one horizontal scanning period 1H. Reference numeral 20 designates an adder circuit and 21, a subtraction circuit. The signals $S_3=S_{CL}+S_{IL}$ (or $S_3'=S_{CL}-S_{IL}$) in a certain horizontal scanning period $H_i$ and the signal $S_3'=S_{CL}-S_{IL}$ (or $S_3=S_{CL}+S_{IL}$) in the subsequent horizontal scanning period $H_{i+1}$, which are derived from the delay circuit 19 and the bandpass filter 18 are supplied to the adder circuit 20 to be added together, providing as an output a chrominance signal $2S_{CL}$ such as depicted in FIG. 4D. In this case, the content of chrominance signals in adjacent horizontal scanning periods are so similar that they can be regarded as substantially the same. Further, it is also possible to delay the signal from the bandpass filter 18 by three or five horizontal scanning periods due to their similarity.

Figure 4E:
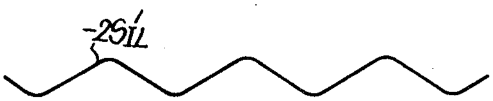
Figure 4F:

These signals $S_3=S_{CL}+S_{IL}$ (or $S_3'=S_{CL}-S_{IL}$) and $S_3'=S_{CL}-S_{IL}$ (or $S_3=S_{CL}+S_{IL}$) in the horizontal scanning periods $H_i$ and $H_{i+1}$ are applied to the subtraction circuit 21 to achieve a subtraction $(S_{CL}-S_{IL})-(S_{CL}+S_{IL})$ { or $(S_{CL}+S_{IL})-(S_{CL}-S_{IL})$ } to derive therefrom an index signal $-2S'_{IL}$ (or $2S'_{IL}$, though not shown) such as depicted in FIG. 4E. The resulting index signal $-2S'_{IL}$ (or $2S'_{IL}$) is fed to a limiter circuit 22 to render its amplitude uniform forming an index signal $-2S_I$ (or $2S_I$) as depicted in FIG. 4F.

The index signal $-2S_I$ (or $2S_I$) thus obtained is reversed in phase at every horizontal scanning period, so that the signal $-2S_I$ is corrected in phase in the following manner. Reference numeral 23 designates a change-over switch (an electronic switch in practice), 23$a$ and 23$b$ its fixed contacts and 23$c$ its movable contact. The output side of the limiter 22 is directly connected to one fixed contact 23$a$ of the change-over switch 23 and to the other fixed contact 23$b$ through an inverter 24. The change-over switch 23 is constructed such that the movable contact 23$c$ makes contact with the fixed contacts 23$a$ and 23$b$ alternately for every horizontal scanning period in synchronism with the alternating signal $S_I$ impressed on the primary winding 12$a$ of the transformer 12 to thereby derive the index signal $2S_I$ from the movable contact 23c at all times.

The chrominance signal $S_{CL}$ derived from the adder circuit 20 is supplied to synchronous detectors 25, 26, and 27, respectively. The index signal $S_{IL}$ is supplied to the synchronous detector 25 through a phase shifter 28 which adjusts the phase of the index signal to the axis of the red signal in order to produce a color difference signal R-Y at the output of the detector 25. In a similar manner, the output signal from the phase shifter 28 is supplied to the synchronous detector 26 through a phase shifter 29 to produce a color difference signal G-Y at the output of the detector 26 and the output signal from the phase shifter 29 is supplied to the synchronous detector 27 through the phase shifter 30 to produce a color difference signal B-Y at the output of the detector 27. The phase shifters 29 and 30 change the phase of the input signals by 120° respectively. These color difference signals and the luminance signal $S_Y$ are applied to a matrix circuit 31 to derive color signals $S_R$, $S_G$ and $S_B$ at its terminals $T_R$, $T_G$, and $T_B$, respectively. The color signals thus obtained may be suitably processed to produce color television signals for the NTSC system and other various systems.

Figure 6:
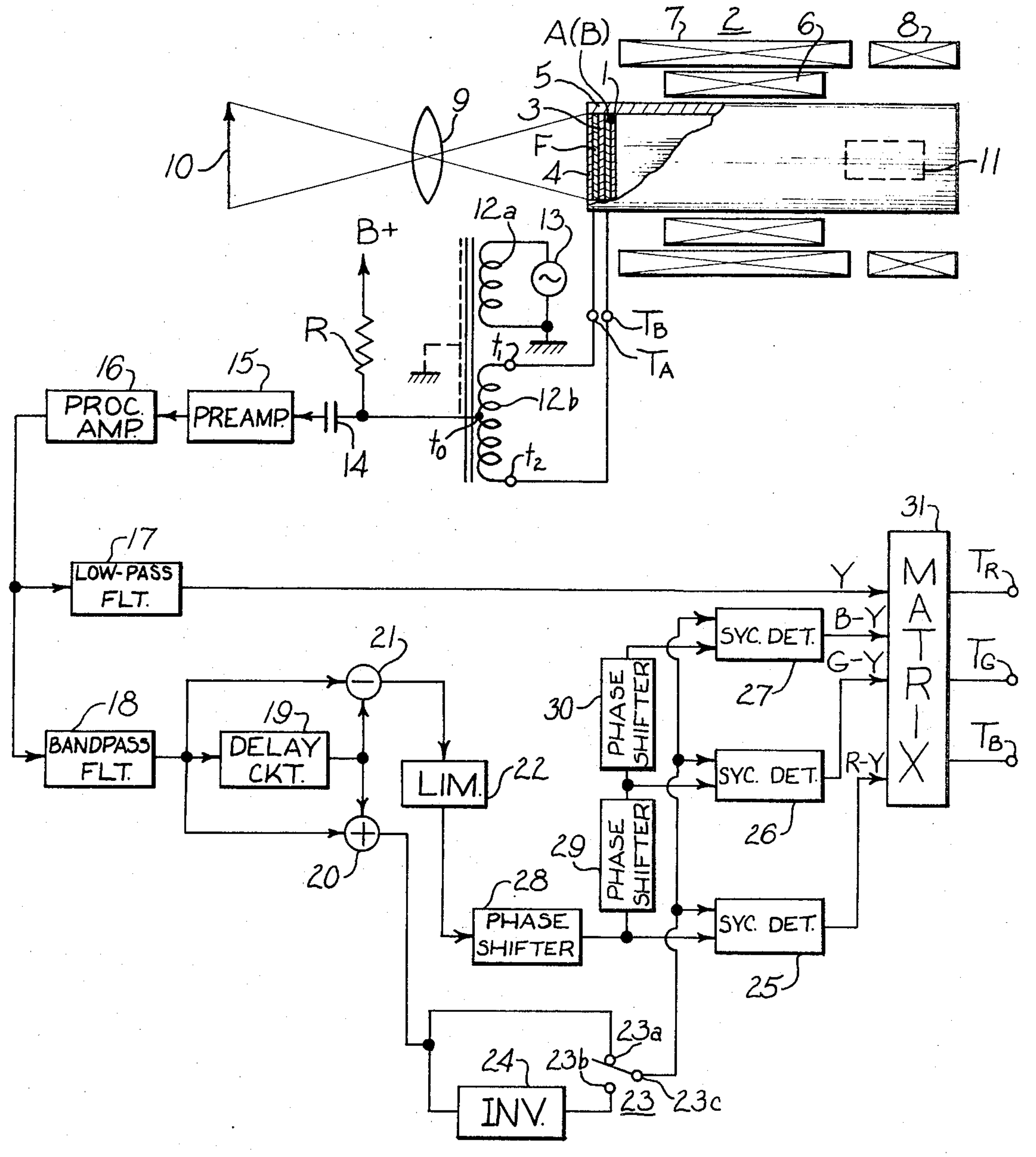
FIG. 6 is a system diagram illustrating one example of a color television camera according to the present invention.

FIG. 6 shows one example of a camera modified to include the improved features of the present invention. Most of the components in FIG. 6 are identical to those in FIG. 1 and have been given the same reference characters. The difference between the system in FIG. 1 and the system in FIG. 6 is that in FIG. 6 the output of the subtractor circuit 22, from which the index signal $-2S_I$ (or $2S_I$) is derived, is connected through the limiter 22 to the phase shifter circuit 28. As a corollary, the output of the adder circuit 20, from which the chrominance signal $2S_{CL}$ is derived, is connected to one fixed contact 23$a$ of the switch 23 and to other fixed contact 23$b$ through the inverter 24. Therefore, the chrominance signal thus obtained from the movable contact 23$c$ is reversed in phase at every horizontal scanning period. As a result, the chrominance signal applied to the synchronous detectors 25, 26, and 27 is in phase with the index signal, which also is reversed in phase at every horizontal scanning period.

Figure 7:
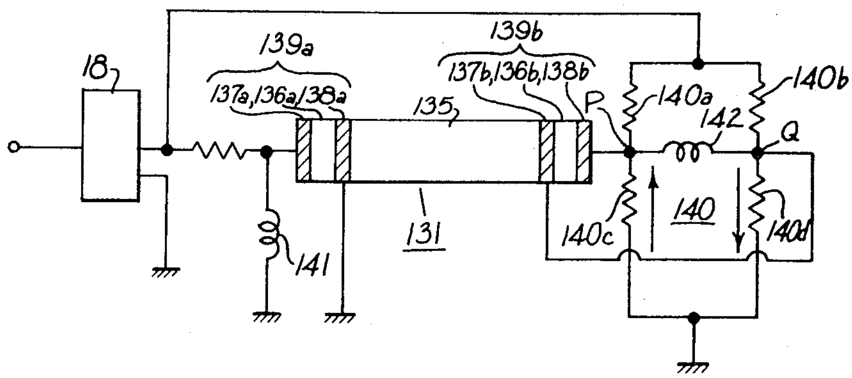
FIG. 7 shows the delay and adder circuits in the camera in FIG. 6.

FIG. 7 shows an actual embodiment of a delay circuit suitable for use as the delay circuit 19. In addition, FIG. 7 shows an adder circuit suitable for use as the adder 20, and a subtraction circuit suitable for use as the subtractor 21.

The delay circuit is an ultrasonic delay line 131 which comprises a delay medium for delaying a signal for one horizontal scanning period. For example, the delay medium may be a bar 135 made of glass with a pair of electromechanical transducers 139$a$ and 139$b$ provided on opposite ends of the glass bar 135. The transducers consist of barium titanate plates 136$a$ and 136$b$ and electrodes 137$a$, 138$a$, 137$b$, and 138$b$ formed on both sides of the barium titanate plates by an electroless plating process or by vapor deposition of metal.

Signals 180° out of phase with respect to each other are obtained from the electrodes 137$b$ and 138$b$, and these signals are supplied to connecting points P and Q of a bridge circuit 140. Inductors 141 and 142 are provided to compensate for the inherent capacitances of the transducers 139$a$ and 139$b$.

An additive signal and a subtractive signal are obtained from the points P and Q, respectively.

Figure 8:
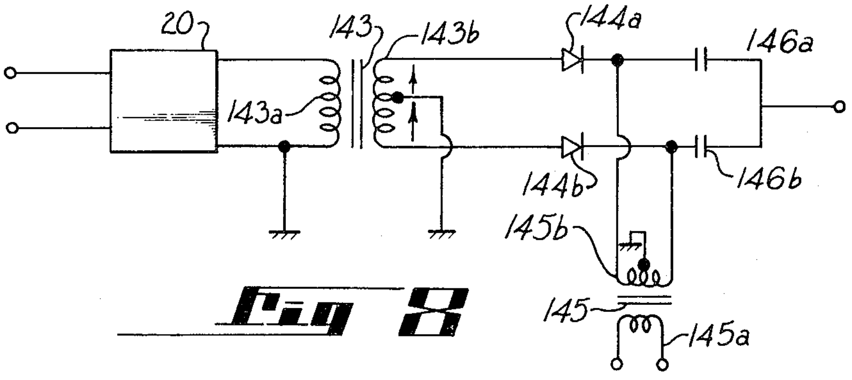
FIG. 8 shows a switch of the type used in the camera in FIG. 6.

FIG. 8 shows an example of a switch circuit suitable for use as the switch 23 in FIG. 6. The switching circuit comprises an input transformer 143 having a primary winding 143*a* and a secondary winding 143*b*, the center tap of which is grounded. Both the normal and the polarity-reversed chrominance signals are obtained from the secondary winding, one of these signals from each half of the secondary.

Two diodes 144*a* and 114*b* are connected to the ends of the secondary winding 143*b*, and a transformer 145 is provided to supply conductive bias signals to the diodes. The transformer 145 has a primary winding 145*a* connected to the signal source 13 to be actuated by signals therefrom. The transformer 145 also has a secondary winding 145, the center tap of which is grounded. The ends of the secondary 145*b* are connected to the common connections of the diodes 144*a* and 144*b* with two coupling capacitors 146*a* and 146*b*, respectively. The diodes 144*a* and 144*b* are alternately made conductive at every horizontal scanning line by signals applied to the primary 145*a* to pass the normal and polarity-reversed chrominance signals alternately.

Figure 9:
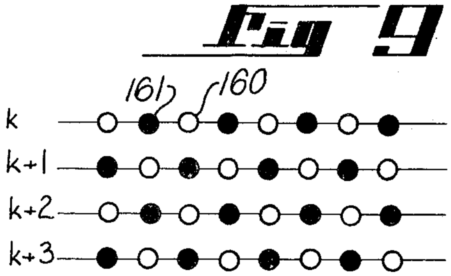
FIG. 9 shows a pattern of light and dark dots as they would appear in a reproduced television picture.

As shown in FIG. 9, bright dots 160 and dark dots 161 appear on the horizontal scanning line K of the reproduced color picture by virtue of the leakage carrier signal. In the camera system shown in FIG. 1, the bright dots 160 and dark dots 161 would be aligned as vertical lines to produce a striped pattern. However, according to this invention, the dark dots 161 and bright dots 160 appear at the different places on lines K+1, K+2, etc., and so the striped pattern due to leakage carrier signal is inconspicuous in the reproduced color picture.

Figure 11:
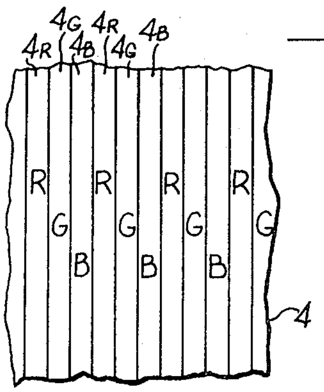
FIG. 11 is a schematic diagram showing an example of a color filter used in the camera according to FIG. 10.
Figure 10:
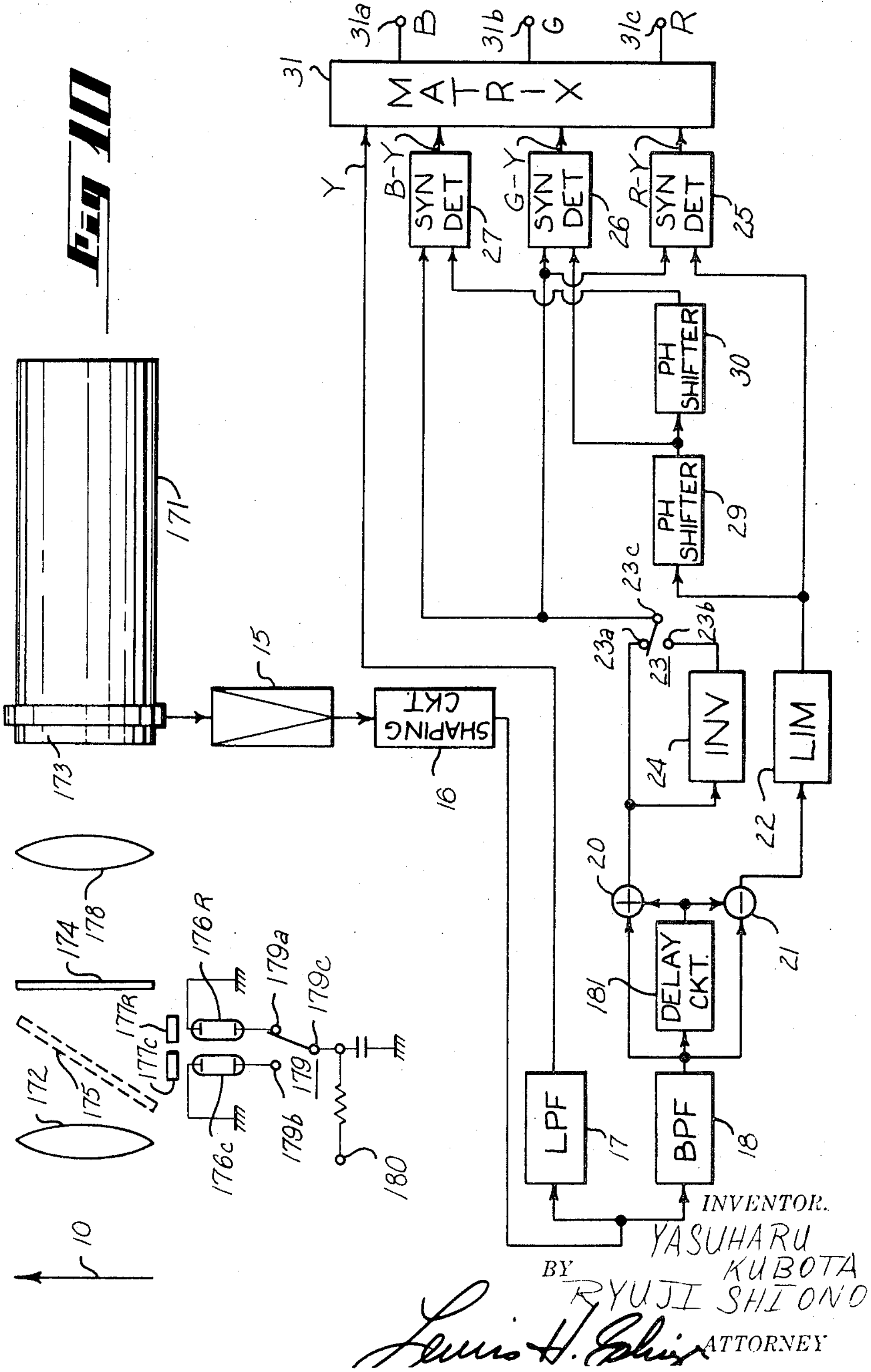
FIG. 10 is a schematic diagram illustrating another embodiment of a color television camera according to the present invention.

FIGS. 10–12 show another embodiment of this invention. In FIG. 10, reference numeral 10 indicates an object to be televised, 171 is an image pickup tube, for example, a vidicon for generating an ordinary black-and-white television signal, 172 is a pickup lens disposed in front of the scanning surface 173 of the image pickup tube 1, that is, in front of the photoelectric conversion surface thereof, and 174 is a color filter positioned between the pickup lens 172 and the scanning surface 173. The color filter 4 (FIG. 2) consists of a plurality of red strip filter elements 4R, a plurality of green strip filter elements 4G and a plurality of blue strip filter elements 4B. In the filter 174 as shown, the color strip filter elements 4R, 4G, and 4B are vertically arranged in a predetermined order in parallel with one another. Between the pickup lens 172 and the color filter 4 there is disposed a half mirror 175 in a plane at about 45° with respect to the plane of the color filter 4. Two xenon discharge tubes 176R and 176C are disposed in such a manner that rays of light from the xenon discharge tubes 176R and 176C intersect the reflection plane of the half mirror 175 at about 45° and further so that the discharge tubes 176R and 176C do not interfere with the light passed through the pickup lens 172. A red color filter 177R is interposed between one xenon discharge tube 176R and the half mirror 175 and a cyan color filter 177C is interposed between the other xenon discharge tube 176C and the half mirror 175. The light emitted from the object 10 is projected on to the scanning surface 173 of the image pickup tube 171 through the pickup lens 172, the half mirror 175, the color filter 4, and a relay lens 178. The light radiated from the xenon discharge tubes 176R and 176C passes respectively through the red and cyan color filters 177R and 177C to be filtered as red light and cyan light and the red light and cyan light is reflected by the half mirror 175 and then led to the scanning surface 173 of the image pickup tube 171 through the color filter 4 and the relay lens 178. One electrode of each of the xenon discharge tubes 176R and 176C is grounded while the other electrodes thereof are respectively connected to fixed contacts 179*a* and 179*b* of a switch 179. A movable contact 179*c* of the switch 179 is connected to ground through a capacitor and also to a terminal 180 of a DC power source through a resistor. The movable contact 179*c* of the switch 179 is switched from one to the other of the fixed contacts 179*a* and 179*b* in synchronism with the vertical synchronizing signal. Thus, the xenon discharge tubes 176R and 176C are alternately lit within the vertical blanking period. With such an arrangement, electric charge images corresponding to the red strip filters 4R or electric charge images corresponding to the green and blue strip filters 4G and 4B are alternately formed on the photoelectric conversion surface 173 of the image pickup tube 171 in response to energizing of the xenon discharge tubes 176R and 176C, respectively. Thereafter, the color-separated electric charge image of the object 10 is formed on surface 173 in overlapping relation to the image of red strip filter 4R or the image of green and blue strip filters 4G and 4B. Thus, at the output terminal of the image pickup tube 171 there is obtained a color video signal which is alternately superposed upon a signal due to red bias light or a signal due to cyan bias light.

Figures 12A, 12B, 12C, 12D:
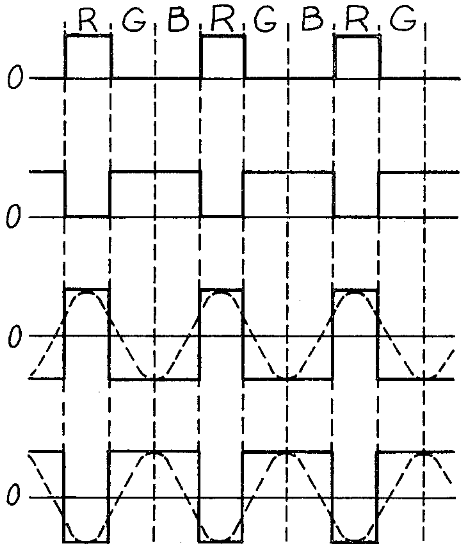
FIGS. 12A to 12D, inclusive, are waveform diagrams for explaining the camera in FIG. 11.

A red color bias signal shown in FIG. 12A is superposed on the video signals of the odd number fields, while a cyan color bias signal, as shown in FIG. 12B, is superposed on the even number field video signals. The output signal from the image pickup tube 171 is supplied through a preamplifier 15 and a shaping circuit 16 to a low-pass filter 17 capable of passing therethrough a luminance signal and also to a band-pass filter 18 capable of passing therethrough a chrominance signal. The output of the low-pass filter 17 is applied to a color demodulation matrix circuit 31, while the output of the band-pass filter 18 is supplied to a delay circuit 181 for delaying the output by one vertical period, for example, 1/60 second, and also to an adder circuit 20 and a subtracter circuit 21. The output of the delay circuit 181 is applied to the adder circuit 20 and the subtracter circuit 21, respectively. Consequently, the chrominance signal superposed on the odd number field red color bias signals and the chrominance signal superposed on the even number field cyan color bias signals are added to each other in the adder circuit 20. In the embodiment being described, as is apparent from FIGS. 12A and 12B, the red color bias signal and the cyan color bias signal are opposite in phase and hence the bias light signals cancel each other, so that only the chrominance signal is obtained from the adder circuit 20. On the other hand, in the subtracter circuit 21, an odd number field chrominance signal and an even number field signal are subtracted, so that the chrominance signal is canceled from the output of circuit 21. However, since the light bias signals of the odd and even number field signals are opposite in phase as shown in FIGS. 12A and 12B, a first index signal shown in FIG. 12C is obtained in the odd number fields, while a second index signal the phase of which is opposite to that of the first index signal, namely different from that of the first index signal by 180°, is obtained as shown in FIG. 12D. In this case, since the red color bias light signal shown in FIG. 12A and the cyan color bias light signal shown in FIG. 12B pass through the band-pass filter 18, the high-frequency and low-frequency components thereof are eliminated. Accordingly, first and second sine-wave index signals, represented by dotted lines in FIGS. 12C and 12D, are provided as the output of the subtracter circuit 21. Such first and second index signals are applied to a limiter amplifier 22 for making constant the amplitudes thereof. The output side of the adder 20 is connected directly to a fixed contact 23*a* of a switch 23 and through a phase inverter circuit 24 to another fixed contact 23*b* of the switch 23. A movable contact 23*c* of the switch 23 is alternately connected to the fixed contacts 23*a* and 23*b* during successive vertical periods. In this case, it may be preferred to couple the movable contact 23*c* of the switch 23 to the movable contact 179*c* of the switch 179. Thus, an index signal which is made by causing the first index signal to agree in phase with the second index signal is obtained at the movable contact 23*c* of the switch 23. The index signal obtained at the movable contact 23*c* is applied to three synchronous detector circuits, or demodulators, 25–27. The output of the limiter 22 is connected to the first of these demodulators 25 and the phase of the signals from the limiter and the arm 23*c* of the switch 23 is such as to generate a color difference signal R-Y in the demodulator 25. The limiter 22 is also connected to the input of a phase shifter 29. The output of the phase shifter 29 is applied to another phase shifter circuit 30 and to the second synchronous detector circuit 26. The output of the phase shifter circuit 30 is applied to the third synchronous detector 27. The synchronous detector circuits 25, 26, and 27 also receive the output of the adder circuit 20 (the chrominance signal). From the synchronous detector circuits 25–27, color differential signals (R-Y), (G-Y) and (B-Y) are respectively obtained and are applied to a matrix circuit 31. Thus, B (blue), G (green) and R (red) signals are provided at output terminals 31*a*, 31*b*, and 31*c*, respectively, of the matrix circuit 15.

Figure 13:
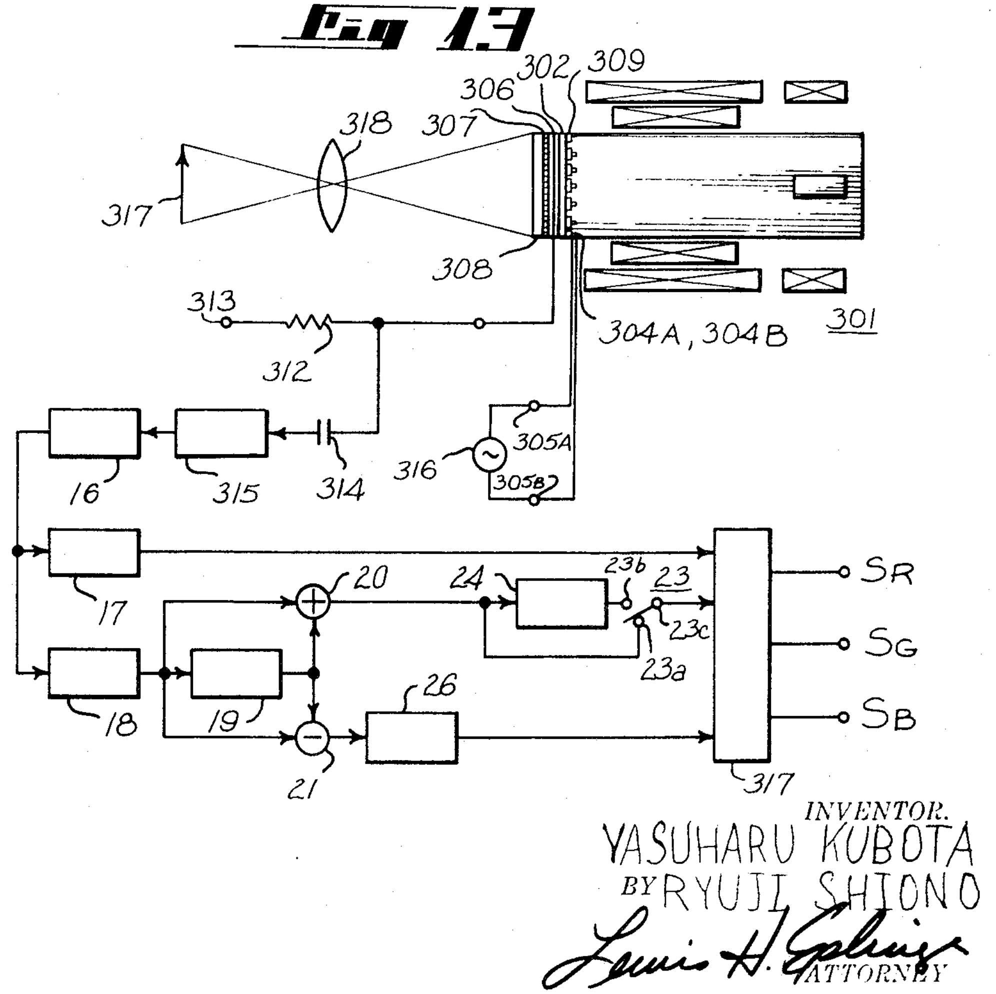
FIG. 13 is a system diagram showing a still different embodiment of the invention.

Although the foregoing examples have been described in connection with using an image pickup tube provided with two sets of electrodes, it is possible to provide on electrode for deriving a video signal including an index signal. FIG. 13 illustrates an example employing such an electrode. Reference numeral 301 indicates generally an image pickup tube and 302, a thin transparent insulating layer such as glass. A plurality of sets of electrodes, in the illustrated example, two sets of electrodes 304A and 304B are deposited on the insulating layer 302 on the opposite side from an electron gun 303. Narrow, strip-like transparent electrodes of predetermined width are sequentially arranged at predetermined intervals across the electron beam scanning direction in a direction crossing the electron beam scanning direction at right angles in the illustrated example. Alternate electrodes 304A are connected together to a common terminal 305A to provide one set of electrodes and the other alternate electrodes 304B are similarly connected to a common terminal 305B to provide the other set of electrodes. On these electrodes 304A and 304B there is disposed a transparent insulating place 306, such as glass, on which a color filter 307 is placed. The color filter 307 consists of a color filter strip element permitting the passage therethrough of red colored light, a color filter strip element permitting the passage therethrough of green colored light, and a color strip filter element permitting the passage therethrough of blue colored light, the color filter elements being of the same width and sequentially arranged in a repeating cyclic order in the direction of array of the electrodes 304A and 304B while extending parallel to the length of the electrodes 304A and 304B. The color filter 307 is disposed in such a manner that each triad of the color filter elements corresponds to two adjacent electrodes 304A and 304B. A faceplate 308 is disposed over the filter 307.

A transparent signal electrode 309 of network structure is formed on the thin insulating layer 302 on the side of the electron gun 303. The signal electrode 309 is formed of, for example, nesa as is the case with the signal electrode of the usual image pickup tube but is of network structure. This electrode 309 is connected to an output terminal 310. A photoconductive layer is formed all over the signal electrode 309 and each segment thereof.

The output terminal 310 is connected to a power source terminal 313 through a resistor 312 and to a preamplifier 315 through a capacitor 314.

Figure 3:
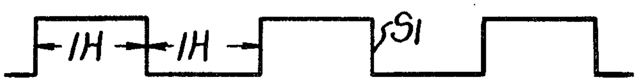
FIGS. 3 and 4A–F are waveform diagrams for explaining the operation of the camera in FIG. 1.

An alternating signal synchronized with the horizontal scanning period of the electron beam is supplied between the aforementioned electrodes 304A and 304B as in the example of FIG. 1. Namely, a signal source 316, which produces a rectangular wave signal repeatedly turning on and off at every horizontal scanning period as shown in FIG. 3, is connected between the terminals 305A and 305B, through which the signal is applied to the electrodes 304A and 304B. The potential applied to the electrodes 304A and 304B is transmitted to the photoconductive layer through the thin insulating layer 302 and the signal electrode 309. As a result of this, when no light is directed to the photoconductive layer, there is formed on the photoconductive layer a dot-like potential pattern in which the potential is high at those areas corresponding to the electrodes 304A and low at those areas corresponding to the electrodes 304B in a certain horizontal scanning period and a dot-like potential pattern which is opposite in sense to the one described above in the subsequent horizontal scanning period. Accordingly, when no light is incident on the photoconductive layer, rectangular wave signals $S_l$ and $-S_l$, such as shown in FIGS. 4A and 4A′ are respectively derived from the electrode 309 contiguous to the photoconductive layer in two consecutive horizontal scanning periods as in the example of FIG. 1, and these rectangular wave signals are derived from the output terminal 310 through the capacitor 314. It will be understood that color video signals can be obtained from the resulting output by the use of circuits similar to those in FIG. 1.

The circuit to which the output signal from the tube 301 is connected is generally similar to that in FIG. 6 and comprises the preamplifier 315, a processing amplifier 16 and circuits for the luminance and chrominance components. The luminance components pass through a low-pass filter 17 to a matrix circuit 317 as the signal $S_Y$. The chrominance components are routed through a band-pass filter 18, the output of which is directed to three circuits: a delay circuit 19 that delays the signal for one horizontal line interval, an adder 20, and a subtractor 21. The output of the delay circuit 19 is also connected to the adder 20 and to the subtractor 21. The output of the adder is passed through a limiter 26 and emerges as the index signal $2S_I$. The chrominance signal emerges from adder 20 and is applied to an inverter 24 and to one fixed terminal 23*a* of a switch 23. The output of the inverter 24 is connected to the other fixed terminal 23*b* of the switch 23 and the output of the switch, taken from arm 23*c*, is the chrominance signal $2S_C$, which is inverted at the end of each horizontal line interval. The operation of the matrix circuit is such that three primary color signals $S_R$, $S_G$, and $S_B$ similar to the matrix circuit in FIG. 6.

What is claimed is:

1. A color television camera comprising:

A. Image pickup means having a photoconductive surface for the photoelectric conversion of images projected thereon into an electrical output;

B. Color filter means disposed between said surface and an object to be reproduced for forming a color-separated image of said object on said surface;

C. Means for forming on said surface an index image having a phase that changes alternately in successive periods of said output so that said electrical output is a composite signal containing a color video signal corresponding to said color-separated image and an index signal corresponding to said index image;

D. Delay circuit means for delaying said composite signal by one of said periods;

E. Adding circuit means for adding the output of said delay circuit means and said composite signal to produce said color video signal as an output from said adding circuit means;

F. Subtracting circuit means receiving said composite signal and said output of the delay circuit means to produce said index signal as the difference therebetween;

G. Inversion means for reversing the polarity of said color video signal;

H. Switch means connected to said inversion means for alternately passing said color video signal and said polarity-reversed color video signal; and I. Means controlled by said index signal for separating individual color component signals from said color video signal.

2. The camera of claim 1 comprising means to change the phase of said electrical output due to said index image at the end of each horizontal scanning output.

3. The camera of claim 1 comprising means to change the phase of said electrical output due to said index image at the end of each vertical scanning output.

4. The camera of claim 1 in which said means for separating individual color component signals comprises a matrix circuit and separate color difference signal demodulators connected thereto to supply color difference signals to said matrix circuit.

5. The camera of claim 4 comprising means to supply said index signal and chrominance signals of selected polarity to said detectors.

6. The camera of claim 5 comprising phase shifting means connecting said index signal to said detectors to supply index signals of separate selected phase to each of said detectors.

7. A color television camera for generating an electrical signal corresponding to an object in the field of view of said camera, said camera comprising:

A. A scanning surface adapted to convert light projected thereon into an electrical output;

B. Filter means disposed between said object and said scanning surface and adapted to form on said scanning surface a first color video image whereby said electrical output comprises luminance signal components and chrominance signal components in accordance with the color components of said object;

C. Means for forming on said scanning surface a second index image in overlapping relation with said first image to indicate the relationship between the color components of said object;

D. Means for converting said index image into an index signal; and

E. Means for periodically reversing the polarity of said chrominance signal components.

* * * * *